(12) United States Patent
Ogawa

(10) Patent No.: US 12,407,207 B2
(45) Date of Patent: Sep. 2, 2025

(54) INSULATING MEMBER FOR SLOT COIL OF ROTARY ELECTRIC MACHINE AND METHOD FOR MOLDING THE SAME

(71) Applicant: NAKAGAWA SPECIAL STEEL INC., Tokyo (JP)

(72) Inventor: Noritaka Ogawa, Tokyo (JP)

(73) Assignee: NAKAGAWA SPECIAL STEEL INC., Tokyo (JP)

( * ) Notice: Subject to any disclaimer, the term of this patent is extended or adjusted under 35 U.S.C. 154(b) by 339 days.

(21) Appl. No.: 17/920,804

(22) PCT Filed: Apr. 21, 2021

(86) PCT No.: PCT/JP2021/016218
§ 371 (c)(1),
(2) Date: Oct. 24, 2022

(87) PCT Pub. No.: WO2021/215482
PCT Pub. Date: Oct. 28, 2021

(65) Prior Publication Data
US 2023/0208235 A1   Jun. 29, 2023

(30) Foreign Application Priority Data
Apr. 24, 2020  (JP) ................. 2020-077333

(51) Int. Cl.
*H02K 3/34* (2006.01)
*H02K 15/085* (2006.01)
(Continued)

(52) U.S. Cl.
CPC ........... *H02K 3/345* (2013.01); *H02K 15/085* (2013.01); *H02K 15/10* (2013.01); *H02K 15/12* (2013.01)

(58) Field of Classification Search
CPC ........ H02K 3/345; H02K 15/10; H02K 15/12; H02K 15/125; H02K 15/105; H02K 3/34;
(Continued)

(56) References Cited

U.S. PATENT DOCUMENTS 5,341,561 A * 8/1994 Schorm .................... H02K 3/32
310/43
5,780,129 A   7/1998 Ohta
(Continued)

FOREIGN PATENT DOCUMENTS

JP  2003070201  3/2003
JP  2008035687  2/2008
(Continued)

OTHER PUBLICATIONS

"Search Report of Europe Counterpart Application", issued on Apr. 9, 2024, pp. 1-13.
(Continued)

*Primary Examiner* — Donghai D Nguyen
(74) *Attorney, Agent, or Firm* — JCIPRNET

(57) ABSTRACT

Thermoplastic synthetic resin flowing through both gates 173, 173 into lug part flanges 16, 16 collides with a confronting wall 161, converts direction of flow by 90°, changing velocity of flow, and thus fills the lug part flanges 16, 16 and flanges 15,15 on the long side. After this, as thermoplastic synthetic resin flows into thin outer peripheral walls 131, 132 and partition walls 133 at an optimum velocity of flow, thermoplastic synthetic resin flows smoothly and it is possible to form a smooth molded article. The lug part flanges 16,16 and the flanges 15, 15 on the long side serve as runners, so that thermoplastic synthetic resin flows smoothly into the thin outer peripheral walls 131,132 and partition wall 133.

8 Claims, 12 Drawing Sheets

(51) Int. Cl.
  *H02K 15/10* (2006.01)
  *H02K 15/12* (2006.01)
(58) Field of Classification Search
  CPC .................. H02K 15/085; H02K 3/30; B29C 2045/0027; B29C 45/0046; B29C 45/2624; B29C 45/20; B29C 45/27; B29C 45/2708; B29C 2067/00; B29L 2031/3412; Y10T 29/49002; Y10T 29/49012
  USPC ........................................................ 310/215
  See application file for complete search history.

(56) References Cited

U.S. PATENT DOCUMENTS

| | | | | |
|---|---|---|---|---|
| 10,424,985 | B2* | 9/2019 | Grübel | H02K 3/345 |
| 10,566,854 | B2* | 2/2020 | Koizumi | H02K 3/12 |
| 2014/0191629 | A1* | 7/2014 | Takahashi | H02K 11/25 |
| | | | | 310/68 C |
| 2019/0149023 | A1* | 5/2019 | Weber | H02K 3/345 |
| | | | | 310/216.069 |

FOREIGN PATENT DOCUMENTS

| | | |
|---|---|---|
| JP | 2012148292 | 8/2012 |
| JP | 2018125924 | 8/2018 |
| JP | 2019134677 | 8/2019 |
| JP | 2019161964 | 9/2019 |

OTHER PUBLICATIONS

"International Search Report (Form PCT/ISA/210) of PCT/JP2021/016218," mailed on Sep. 21, 2021, with English translation thereof, pp. 1-4.

* cited by examiner (a)

(b)

(a)

(b)

(a)

(b)

(a)

(b)

INSULATING MEMBER FOR SLOT COIL OF ROTARY ELECTRIC MACHINE AND METHOD FOR MOLDING THE SAME

CROSS-REFERENCE TO RELATED APPLICATION

This application is a 371 application of an international PCT application serial no. PCT/JP2021/016218, filed on Apr. 21, 2021, which claims the priority benefit of Japan application JP2020-077333, filed on Apr. 24, 2020. The entirety of each of the above-mentioned patent applications is hereby incorporated by reference herein and made a part of this specification.

TECHNICAL FIELD

The present disclosure relates to an insulating member for a slot coil of a rotary electric machine and a method for molding the same. More specifically, the present disclosure relates to an insulating member for a slot coil of a rotary electric machine and a method for molding the same used for insulating lead wire disposed on a stator of a rotary electric machine.

BACKGROUND ARTS

A rotary electric machine is proposed that have a segment coil in a stator of a rotary electric machine such as a motor, electric generator, etc. Lead wire of a segment coil that has a square sectional shape or a rectangular sectional shape (in flat type wire) for improving efficiency of a motor (Patent Document 1, Patent Document 2). Further, such one as using a slot coil for this segment coil is also proposed. With such one, in place of insulating paper, an insulating member is formed through injection molding of resin, and then coil of flat type wire is inserted into a slot of a stator to be assembled as a segment coil (Patent Document 3). A flange is formed on an end of the insulating member and gap between the insulating member and the slot is sealed with the flange, thus varnish for fixing wire is prevented from flowing.

In order to prevent failure of an electric motor with segment coils, it is necessary to raise electric insulation between wire of a slot coil. While insulation can be raised by enlarging thickness, density of lead wire becomes low to lower conversion efficiency of an electric motor as well as to enlarge the electric motor. On the other hand, as generation of heat by copper loss of an electric motor is unavoidable, heat resistance is also required for insulating members. That is, both of insulation and heat resistance are required for insulating members composing a segment coil and yet gap between lead wire is narrow to require being of thin, so that it must be formed to be as thin as possible. However, it is generally difficult to form a thin molded article, for which both insulation and heat resistance are required, by injection molding, because resin does not flow smoothly in a metallic mold. Above all, resin having electric insulation and heat resistance does not flow smoothly.

PRIOR ART DOCUMENTS

Patent Documents

[Patent Document 1] JP: Published Patent Application 2008-35687

[Patent Document 2] JP: Published Patent Application 2019-161964

[Patent Document 3] JP: Published Patent Application 2018-125924

SUMMARY OF DISCLOSURE

Problems to be Solved

The present disclosure is presented under the above background and attains the following objects.

It is an object of the present disclosure to provide an insulating member for a slot coil of a rotary electric machine that is thin and can be manufactured to be of a precise shape and a method for molding the same.

It is another object of the present disclosure to provide an insulating member for a slot coil of a rotary electric machine formed with thermoplastic synthetic resin having high insulation and heat resistance and a method for molding the same.

Means for Solving the Problems

The present disclosure adopts the following means for solving the above problems. That is, in an insulating member for a slot coil of a rotary electric machine according to a first aspect of the present disclosure, said slot coil being fitted into a slot provided in a stator or rotor of the rotary electric machine and composed of:
an insulating member formed by molding of thermoplastic synthetic resin and having through-holes with rectangular cross section for inserting lead wire and parallel to each other as well as having partition walls and outer peripheral walls for insulating the lead wire electrically, and
the wire inserted into the through-holes and having cross section similar to the cross section of the through-holes;
wherein said insulating member has a flange/flanges formed on periphery at one end thereof as well as formed to be thicker than the partition walls and the outer peripheral walls, the flange/flanges serving as flow path for injected molten resin as thermoplastic synthetic resin when the insulating member is formed by injection molding.

The insulating member for a slot coil of a rotary electric machine according to a second aspect of the present disclosure is characterized in that, in the first aspect of the present disclosure,
said flange/flanges consist of two flanges disposed parallel to each other and serve for aligning the insulating member when it is fitted into the slot and the two flanges have a same area of cross section in a plane perpendicular to the lengthwise direction of the flanges, and
plurality of the through-holes is formed in the insulating member.

The insulating member for a slot coil of a rotary electric machine according to a third aspect of the present disclosure is characterized in that, in the first aspect or the second aspect of the present disclosure,
the thermoplastic synthetic resin is a thermoplastic synthetic resin of liquid crystalline fully aromatic polyester having heat resistance and electrical insulation, and
thickness of the partition walls and the outer peripheral walls is 0.15 to 0.55 mm.

A method for molding the insulating member for a slot coil of a rotary electric machine according to a fourth aspect of the present disclosure is characterized in that, in a method for molding the insulating member for a slot coil of a rotary electric machine in the first or second aspect, lug part flanges are disposed to be integral with said flange/flanges for causing molten resin to flow through gates for injecting the molten resin, after then to convert direction of flow by 90° twice and then to flow into said flange/flanges when the insulating member is formed by injection molding of molten resin.

The method for molding the insulating member for a slot coil of a rotary electric machine according to a fifth aspect of the present disclosure is characterized in that, in a method for molding the insulating member for a slot coil of a rotary electric machine in the first aspect or second aspect, the insulating member is formed by injection molding through a fan gate/fan gates provided on the long side of said flange/flanges and having same width with the long side when the insulating member is formed by injection molding.

The method for molding the insulating member for a slot coil of a rotary electric machine according to a sixth aspect of the present disclosure is characterized in that, in the fourth aspect of the present disclosure, each of said flange/flanges has a molten resin basin disposed at one end of said flange/flanges for storing the molten resin in time of injection molding.

The method for molding the insulating member for a slot coil of a rotary electric machine according to a seventh aspect of the present disclosure is characterized in that, in the fifth aspect of the present disclosure, a flow control member for inhibiting or delaying flow of injected molten resin is disposed in said fan gate/fan gates, and also provided with:

a molten resin basin disposed parallel to the fan gate/fan gates and downstream thereof, and a film-shaped runner/runners disposed downstream of the molten resin basin.

The method for molding the insulating member for a slot coil of a rotary electric machine according to an eighth aspect of the present disclosure is characterized in that, in the sixth or seventh aspect of the present disclosure, an injection molding machine used for injection molding is a high-speed injection molding machine with which injection speed attains its peak within 0.1 sec.

Advantageous Effects

With an insulating member for a slot coil of a rotary electric machine and a method for molding the same according to the present disclosure, a thick flange is formed on the outer periphery of a through-hole for inserting lead wire. Consequently, the flange serves as a runner in molding of an insulating member and thermoplastic synthetic resin flows smoothly through the outer peripheral wall and partition wall, so that smooth molded articles having a precise shape can be formed.

DETAILED DESCRIPTION OF EMBODIMENTS

First Embodiment of Insulating Member for Slot Coil

Figure 1:
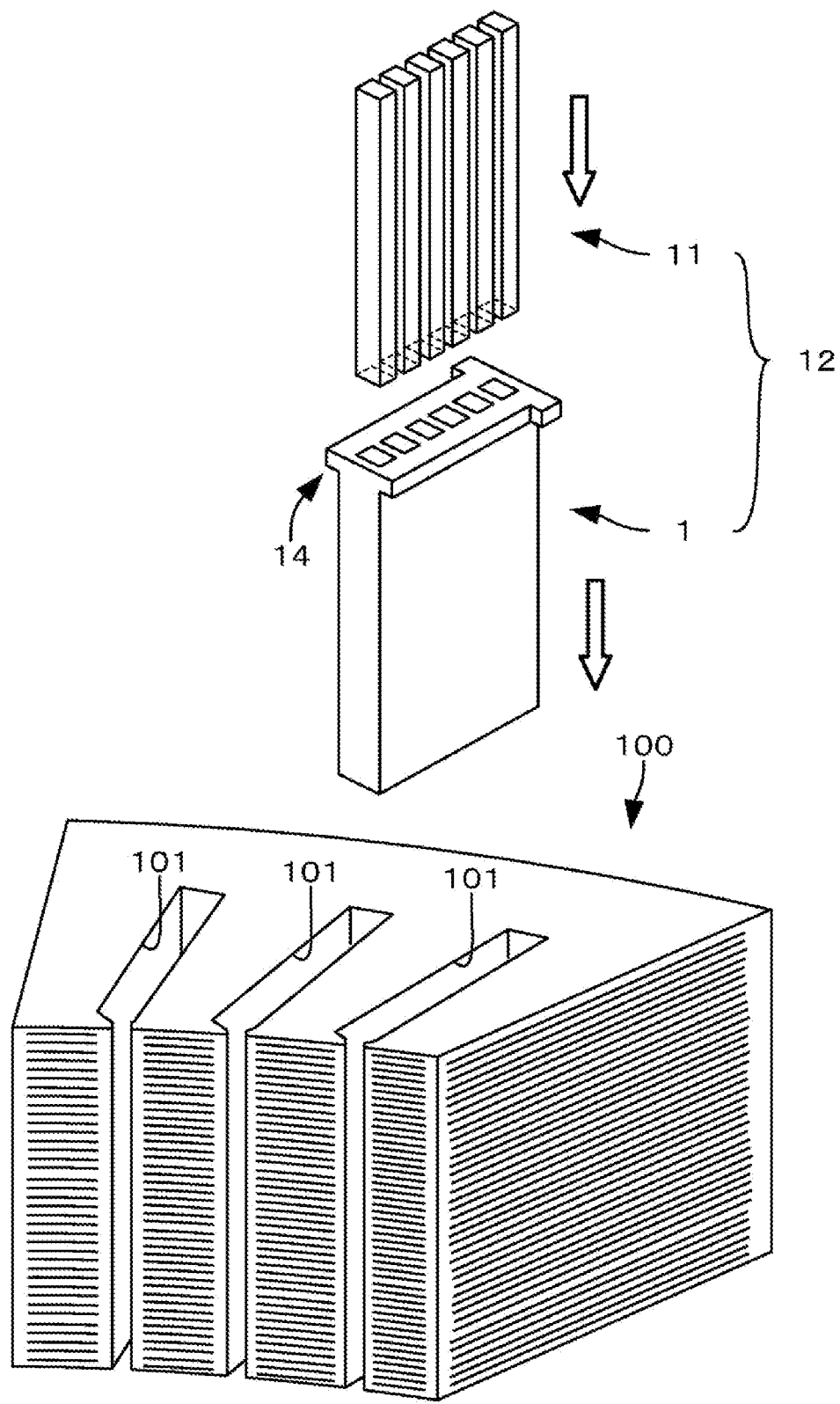
FIG. 1 is an isometric projection view showing a main portion of a stator of a rotary electric machine provided with an insulating member for a slot coil according to the present disclosure.
Figure 2:
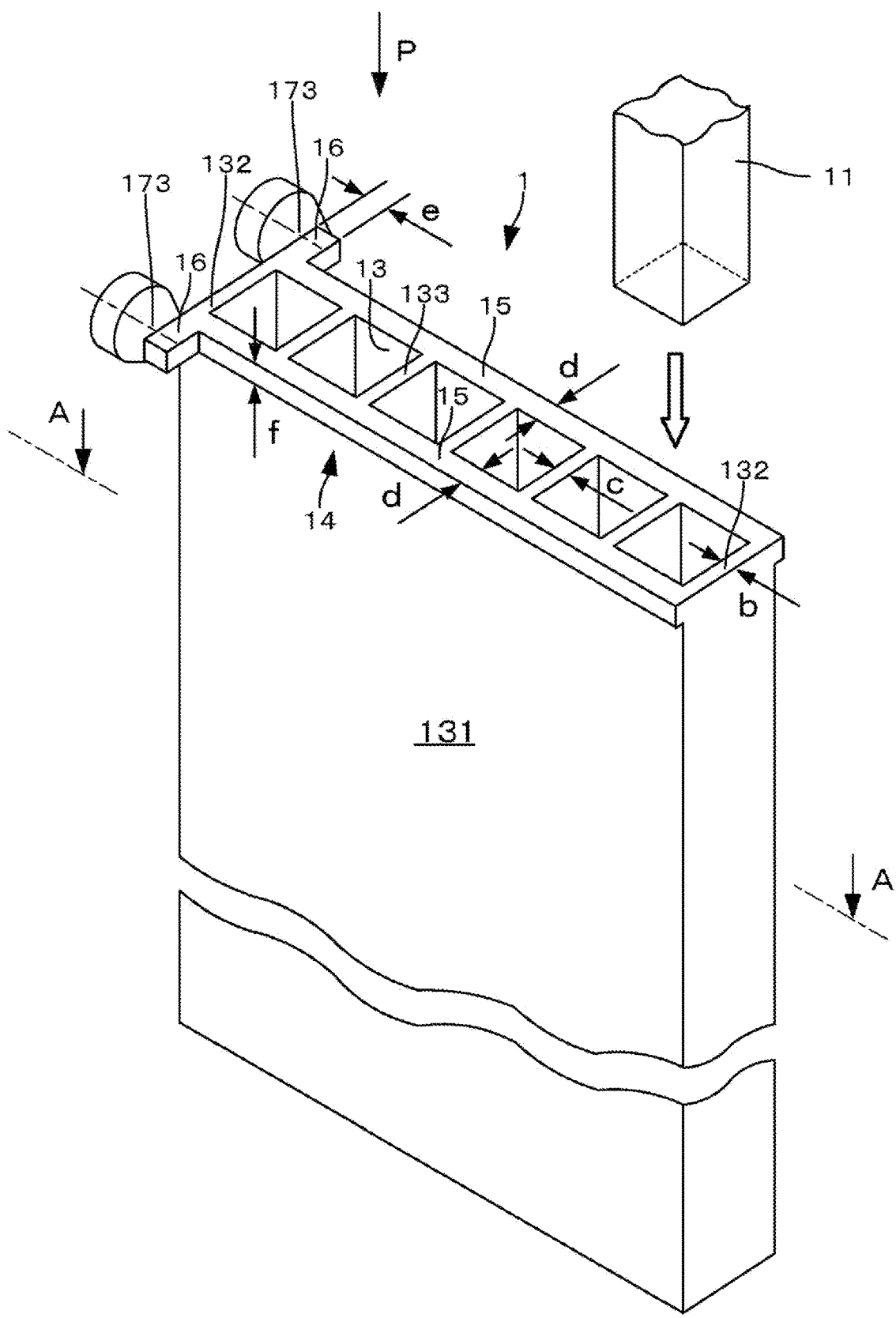
FIG. 2 is an isometric projection view showing whole of an insulating member for a slot coil of a first embodiment of the present disclosure.
Figure 3:
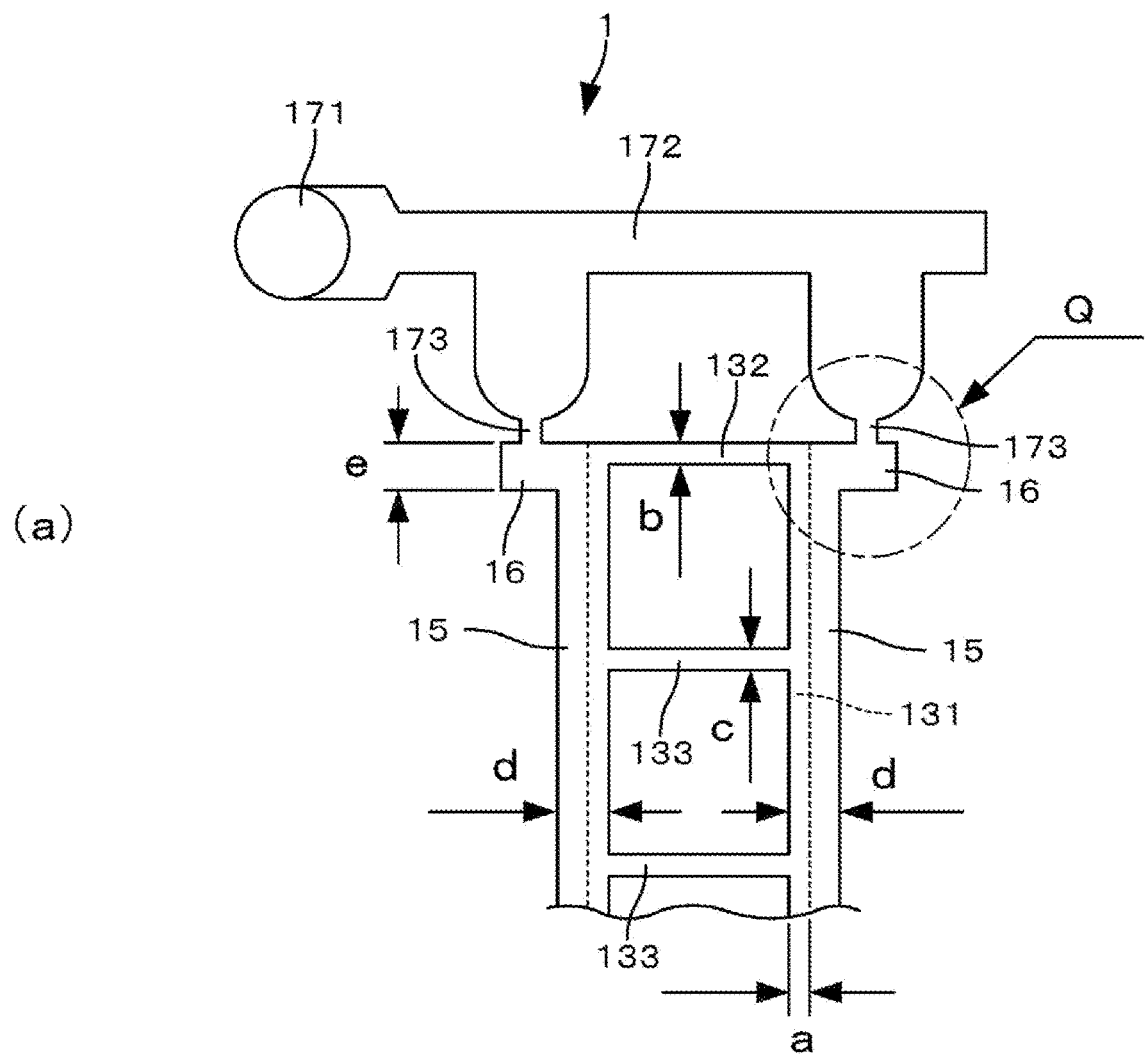
FIG. 3, (a) is a view of FIG. 2 as seen in a direction of an arrow P, and in FIG. 3, (b) is a partial enlarged view of a portion Q of (a) in FIG. 3.
Figure 3:
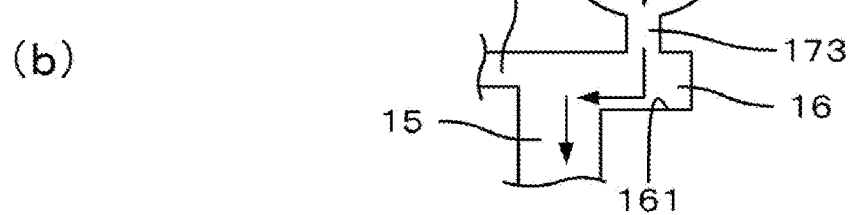
Figure 4:
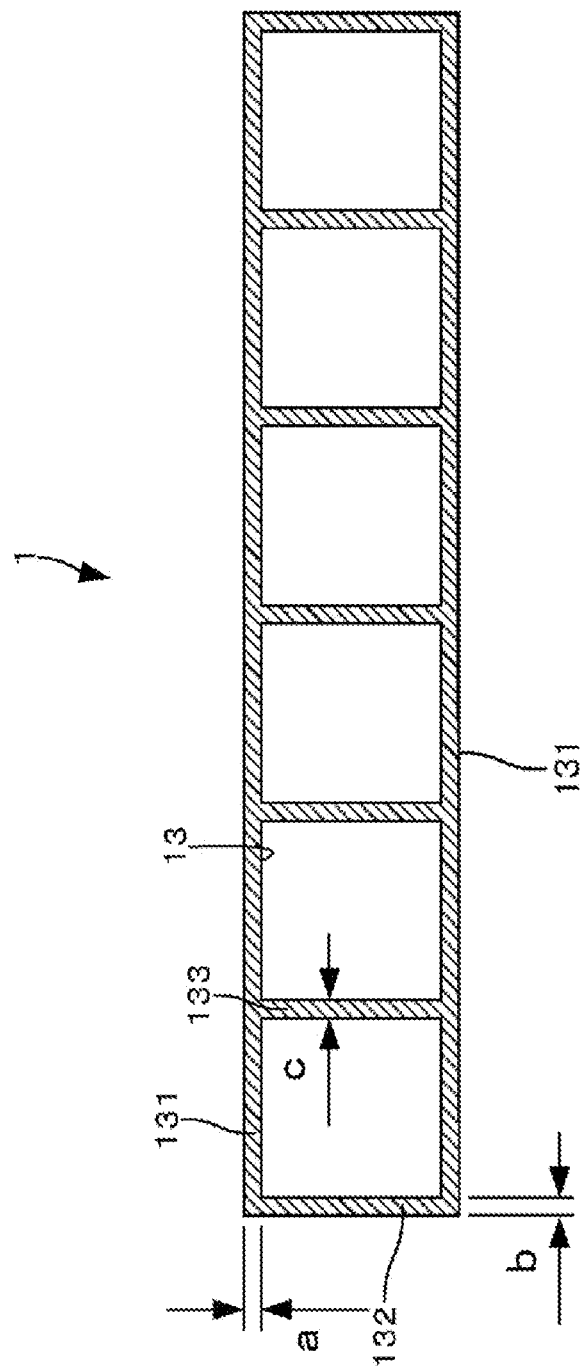
FIG. 4 is a sectional view of FIG. 2 taken along a line A-A.

A first embodiment of the present disclosure will be explained referring drawings below. FIG. 1 is an isometric projection view showing a main portion of a stator of a rotary electric machine provided with an insulating member for a slot coil of the present disclosure. As shown in FIG. 1, slot coils 12, each composed of an insulating member 1 and lead wire 11, are fitted in plurality of slots 101 formed radially on a stator 100 of a rotary electric machine. FIG. 2 is an isometric projection view showing whole of an insulating member for a slot coil of a first embodiment of the present disclosure, FIG. 3, (a) is a view of FIG. 2 as seen in a direction of an arrow P, in FIG. 3, (b) is a partial enlarged view of a portion Q of (a) in FIG. 3 and FIG. 4 is a sectional view of FIG. 2 taken along a line A-A. As shown in FIGS. 2 to 4, six through-holes 13 for inserting lead wire 11 having a rectangular cross section are formed in an insulating member 1 according to the first embodiment of the present disclosure. This insulating member 1 serves for fixing the lead wire and for electrically insulating the lead wire. Each through-hole 13 is formed so as to have a rectangular cross section similar to the cross-sectional shape of the lead wire 11 and these through-holes are disposed parallel to each other. The lead wire 11 in the embodiment is a flat type copper wire (which means "a flat type copper wire", etc., defined in JIS, etc.) and lead wire without insulating film or covered with resin, etc., (of about 60 to 100 μm) is used. The insulating member 1 is formed through injection molding of synthetic resin having high electrical insulation and heat resistance.

As shown in FIG. 4, the insulating member 1 has outer peripheral walls 131, 132 and partition walls 133 of the through-holes 13 and these walls are formed to have a same thickness (a, b, c), being thin as of 0.15 mm to 0.55 mm in this embodiment. In the insulating member 1, flanges 14 are formed on outer periphery at the upper end of the through-hole 13. The flanges 14 are made up of two flanges 15, 15 on the long side and two lug part flanges 16, 16. The flanges 15, 15 on the long side are formed on the two long sides along whole length thereof and each of the lug part flanges 16, 16 is formed to protrude outwards at one end of one flange 15 on the long side. Thickness d of the flanges 15, 15 on the long side, thickness e of the lug part flanges 16, 16 and height f of the flanges 15, 15 on the long side and the lug part flanges 16, 16 are formed to be larger than respective thickness a, b, c of the outer peripheral walls 131, 132 and the partition walls 133 (for example, to be 1 mm). The flanges 14 serve as an aligning stopper when an insulating member 1 is fitted into the slot 101 shown in FIG. 1 and also enable preventing varnish for electrically insulating the lead wire 11 and fixing thereof from leaking. Further, after molding of the insulating member 1, it is not necessary to cut off the flanges 14. Here, the flanges 14 are not an unavoidable matter as function of the insulating member 1 but cut off thereof is not necessary. This is because the flanges 14 serve as an aligning stopper after it is fitted into the slot 101 and do not interfere with other portions composing a rotary electric machine.

As shown in (a) of FIG. 3, thermoplastic synthetic resin injected from a nozzle of an injection molding machine (not shown) flows from a sprue 171 within a metallic mold for injection molding through a runner 172 and gates 173, 173 into lug part flanges 16, 16 respectively. The gates 173, 173 are ones called as side gates provided at ends of a cavity with cross section thereof being of a small circular or rectangular shape, and are pinpoint gates connected to the lug part flanges 16, 16 respectively. Direction of thermoplastic synthetic resin flowing through the gates 173, 173 into the lug part flanges 16, 16 is a direction of thickness of the lug part flanges 16, 16. As shown in (b) of FIG. 3, thermoplastic synthetic resin having flowed through the gates 173, 173 into the lug part flanges 16, 16 collides with confronting walls 161, 161 of the lug part flanges 16, 16 to convert direction of flow thereof by 90°, thereby causing flow-in velocity thereof to decrease. Further, as thermoplastic synthetic resin flows through the lug part flanges 16, 16 into flanges 15, 15 on the long side, it converts direction of flow thereof by 90° and flows into the flanges 15, 15 on the long side, thus filling the flanges 15, 15 on the long side. Then, as thermoplastic synthetic resin flows into the thin outer peripheral walls 131, 132 and partition walls 133 at an optimum flow-in velocity, thermoplastic synthetic resin flows smoothly, thus making it possible to form a smooth molded article having a precise shape. That is, as the lug part flanges 16, 16 and the flanges 15,15 on the long side serve as runners, thermoplastic synthetic resin flows smoothly into the thin outer peripheral walls 131, 132 and the partition walls 133.

Figure 5:
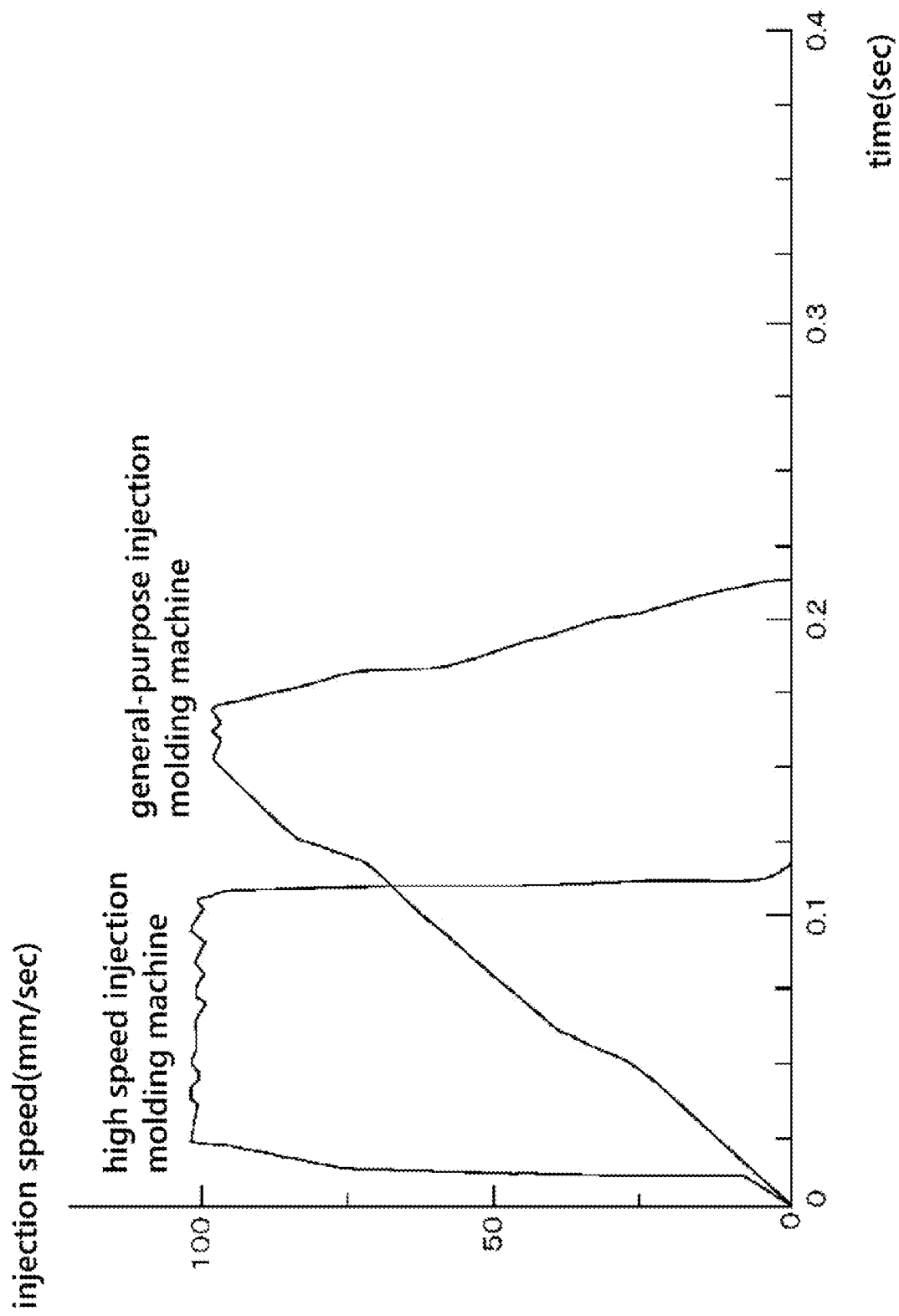
FIG. 5 is a graph showing a waveform of injecting speed of an injection molding machine molding an insulating member for a slot coil of a rotary electric machine of the present disclosure.

It is preferable that thermoplastic synthetic resin used in the first embodiment of the present disclosure is liquid crystalline fully aromatic polyester. Liquid crystalline fully aromatic polyester has electrical insulation and heat resistance, and yet high liquidity if temperature management is conducted precisely (temperature in molding at 320 to 400° C.), so that formability is excellent. Here, as liquid crystalline fully aromatic polyester has low melt viscosity and high solidification speed in molding, there is possibility where resin is solidified in a thin portion without providing sufficient fluidity in a case of an ultrathin article below 0.2 mm. Due to this, as molding is impossible or difficult with a general-purpose injection molding machine, it is preferable to conduct injection molding using a high-speed injection molding machine that has a property of enabling injection speed to attain its peak within 0.1 sec. as shown in FIG. 5.

Second Embodiment of Insulating Member for Slot Coil

Figure 6:
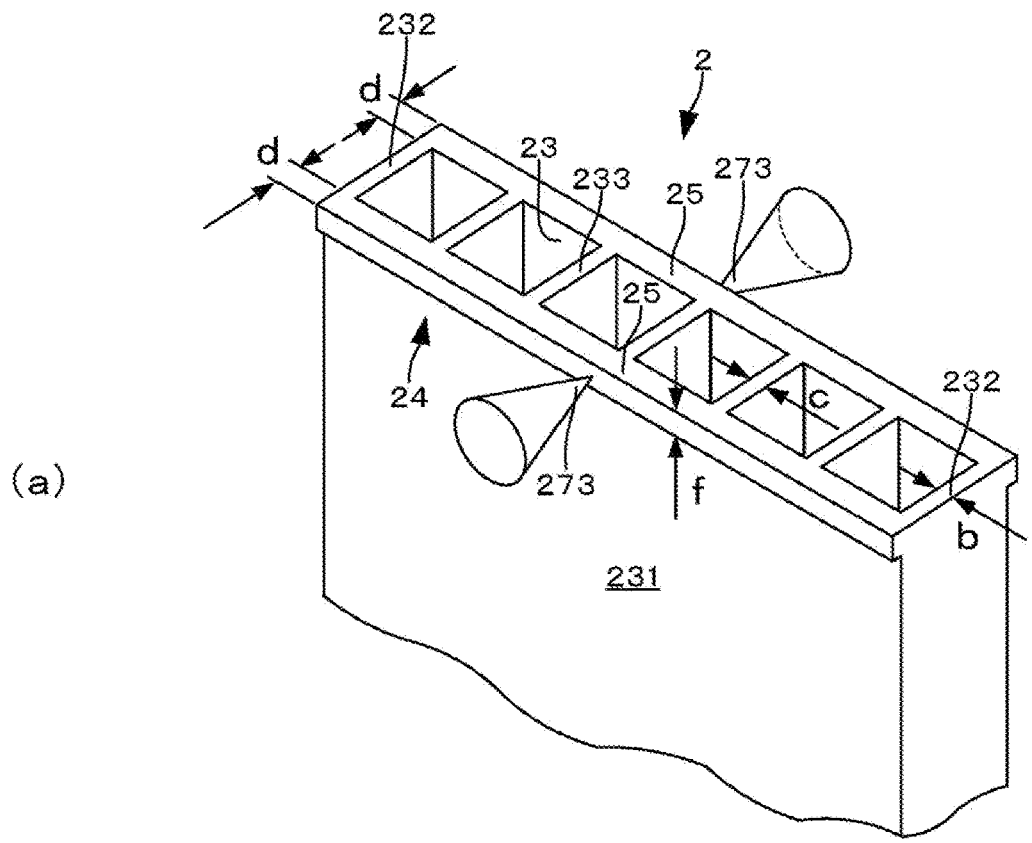
FIG. 6, (a) is an isometric projection view showing a main portion of an insulating member for a slot coil of a second embodiment of the present disclosure and in FIG. 6, (b) is an isometric projection view showing a main portion of an insulating member for a slot coil of a third embodiment of the present disclosure.
Figure 6:
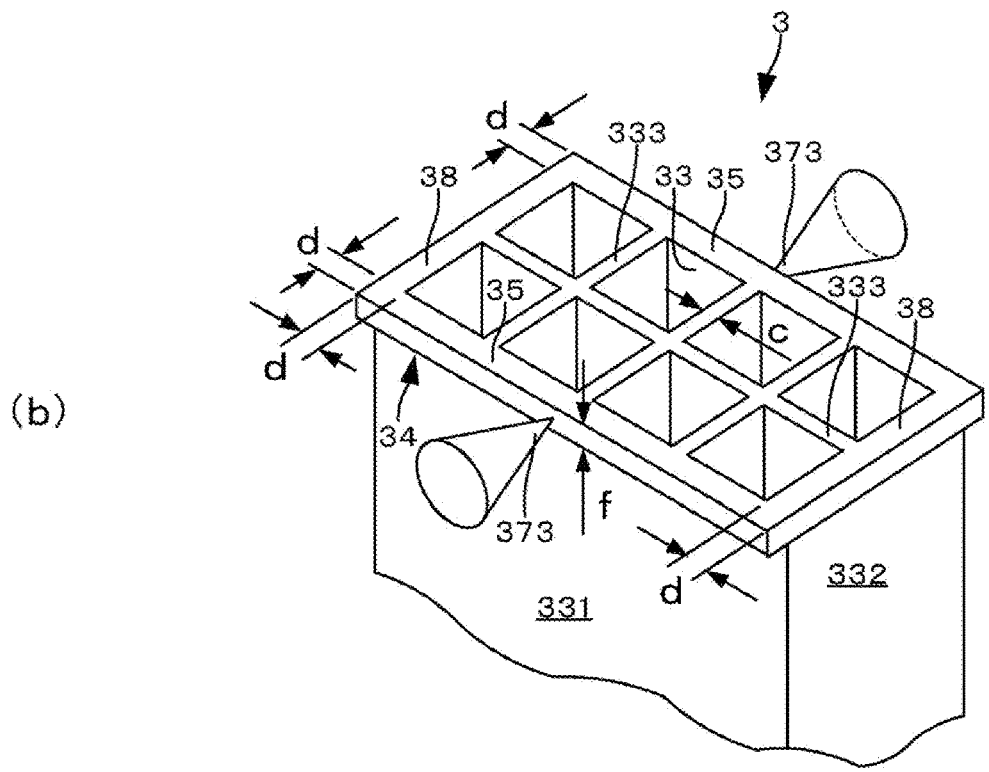

FIG. 6, (a) is an isometric projection view showing a main portion of an insulating member for a slot coil of a second embodiment of the present disclosure. With an insulating member 2 of the second embodiment, there is no lug part flanges 16, 16 in the insulating member 1 of the first embodiment and gates 173, 173 are disposed at different positions. Number and shape of through-holes 23 are same as in the insulating member 1. Further, in the insulating member 2, thickness (a, b, c) of peripheral walls 231 and partition walls 233 of the through-holes 23 are same and formed to be thin of 0.15 mm to 0.55 mm. In the insulating member 2, flanges 24 are formed on outer periphery at the upper end of the through-holes 23. The flanges 24 are made up of two flanges 25, 25 on long side disposed to be parallel to each other. The flanges 25, 25 on the long side are formed on the two long sides along whole length thereof. Thickness d of the flanges 25, 25 on the long side and height f of the flanges 25, 25 on the long side are formed to be larger than respective thickness a, b, c of the peripheral walls 231, 232 and the partition walls 233 (for example to be 1 mm). The flanges 24 serve as an aligning stopper when the insulating member 2 is fitted into the slot 101 shown in FIG. 1 and also enable preventing varnish for electrically insulating the wire 11 and fixing thereof from leaking. Further, after molding of the insulating member 2, it is not necessary to cut off the flanges 24.

Thermoplastic synthetic resin injected through a nozzle of an injection molding machine (not shown) flows through pin side gates 273, 273 into the flanges 25, 25 on the long side respectively. These pin side gates 273, 273 are pin point gates provided at a central position in the lengthwise direction of the flanges 25, 25 on the long side and connected to the flanges 25, 25 on the long sides at a small point respectively. A direction in which thermoplastic synthetic resin flows through the pin side gates 273, 273 into the flanges 25, 25 on the long side is a direction of thickness of the flanges 25, 25 on the long side. Thermoplastic synthetic resin having flowed through the pin side gates 273, 273 into the flanges 25, 25 on the long side collides with confronting walls (not shown) of the flanges 25, 25 on the long side to convert direction of flow thereof by 90°, causing flow-in velocity thereof to decrease and filling the flanges 25, 25 on the long side with it. Then, as thermoplastic synthetic resin flows into the thin outer peripheral walls 231, 232 and partition walls 233 at an optimum flow-in velocity, thermoplastic synthetic resin flows smoothly, thus making it possible to form a smooth molded article. That is, as the flanges 25, 25 on the long side serve as runners, thermoplastic synthetic resin flows smoothly into the thin outer peripheral walls 231, 232 and the partition walls 233.

Third Embodiment of Insulating Member for Slot Coil

FIG. 6, (b) is an isometric projection view showing a main portion of an insulating member for a slot coil of a third embodiment of the present disclosure. An insulating member 3 for a slot coil of the third embodiment of the present disclosure is distinctive in that number of through-holes is different from number of through-holes 23 of the insulating member 2 of the second embodiment, and in that flanges on the short side are added in the third embodiment. That is, with the insulating member 3 of the third embodiment, eight through-holes 33 are formed to be in two rows. Further, with the insulating member 3, outer peripheral walls 331, 332 and partition walls 133 of through-holes 33 are formed to have a same thickness (a, b, c), being thin as of 0.15 mm to 0.55, though not shown in section. In the insulating member 3, flanges 34 are formed on outer periphery at the upper end of the through-holes 33. The flanges 34 are made up of two flanges 35, 35 on the long side and two flanges 38, 38 on the short side. The flanges 35, 35 on the long side are formed on the two long sides along whole length thereof respectively and the flanges 38, 38 on the short side are formed on the two short sides along whole length thereof respectively. Thickness d of the flanges 35, 35 on the long side and the flanges 38, 38 on the short side, and height f of the flanges 35, 35 on the long side and the flanges 38, 38 on the short side are larger than thickness a, b, c of the outer peripheral walls 331, 332 and the partition walls 333 (for example to be 1 mm). The flanges 34 serve as an aligning stopper when the insulating member 3 is fitted into the slot 101 shown in FIG. 1 and also enable preventing varnish from leaking. Further, after molding of the insulating member 3, it is not necessary to cut off the flanges 24.

Thermoplastic synthetic resin injected through a nozzle of an injection molding machine (not shown) flows through pin side gates 373, 373 into the flanges 35, 35 on the long side respectively. The pin side gates 373, 373 are pin point gates provided at a central position in the lengthwise direction of the flanges 35, 35 on the long side and connected to the flanges 35, 35 on the long sides at a small point respectively. A direction in which thermoplastic synthetic resin flows through the pin side gates 373, 373 into the flanges 35, 35 on the long side is a direction of thickness of the flanges 35, 35 on the long side. Thermoplastic synthetic resin having flowed through the pin side gates 373, 373 into the flanges 35, 35 on the long side collides with confronting walls (not shown) of the flanges 35, 35 on the long side to convert direction of flow thereof by 90°, causing flow-in velocity thereof to decrease and filling the flanges 35, 35 on the long side and the flanges 38, 38 on the short side with it. Then, as thermoplastic synthetic resin flows into the thin outer peripheral walls 331, 332 and partition walls 333 at an optimum flow-in velocity, thermoplastic synthetic resin flows smoothly, thus making it possible to form a smooth molded article. That is, as the flanges 35, 35 on the long side and the flanges 38, 38 on the short side serve as runners, thermoplastic synthetic resin flows smoothly into the thin outer peripheral walls 331, 332 and the partition walls 333.

Fourth Embodiment of Insulating Member for Slot Coil

Figure 7:
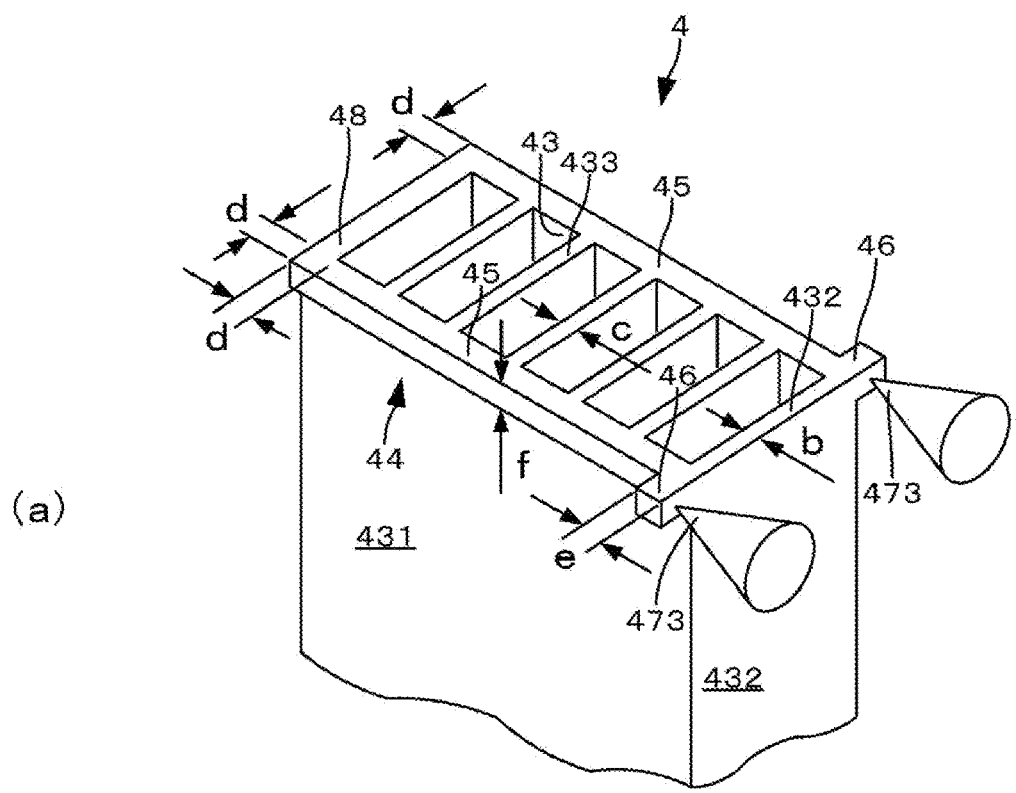
FIG. 7, (a) is an isometric projection view showing a main portion of an insulating member for a slot coil of a fourth embodiment of the present disclosure and in FIG. 7, (b) is an isometric projection view showing a main portion of an insulating member for a slot coil of a fifth embodiment of the present disclosure.
Figure 7:
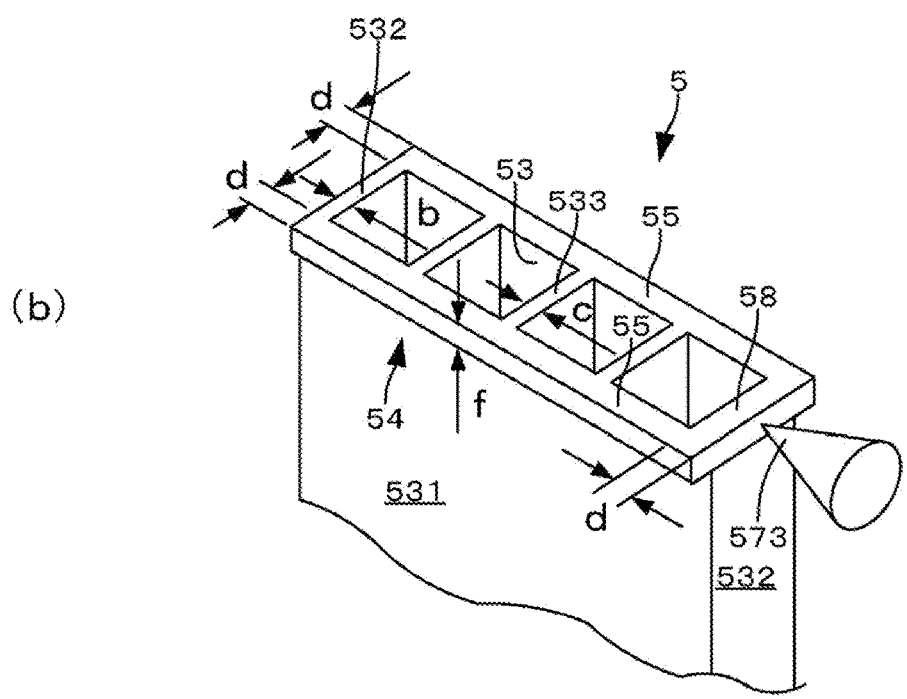

FIG. 7, (a) is an isometric projection view showing a main portion of an insulating member for a slot coil of a fourth embodiment of the present disclosure. An insulating member 4 for a slot coil of the fourth embodiment of the present disclosure is distinctive in that shape of through-holes is different from shape of through-holes 13 of the insulating member 1 of the first embodiment, and in that a flange on the short side is added. That is, with the insulating member 4 of the fourth embodiment, shape of through-holes 43 is rectangular and number of through-holes 43 is six in a same manner. Further, with the insulating member 4, outer peripheral walls 431, 432 and partition walls 433 of through-holes 33 have a same thickness (a, b, c) and formed to be thin as of 0.15 mm to 0.55 mm, though not shown in section. In the insulating member 4, flanges 44 are formed on outer periphery at the upper end of the through-holes 43. The flanges 44 are made up of two flanges 45, 45 on the long side, two lug part flanges 46, 46 and a flange 48 on the short side. The flanges 45, 45 on the long side are formed on the two long sides along whole length thereof respectively and the lug part flanges 46, 46 are formed at one end of the flanges 45, 45 on the long side to protrude from the respective flanges 45, 45 on the long side. Further, the flange 48 on the short side is formed on the other end of the flanges 45, 45 on the long side along whole length of the short side. Thickness d of the flanges 45, 45 on the long side and the flange 48 on the short side, thickness e of the lug part flange 46, 46 and height f of the flanges 45, 45 on the long side, the flanges 48 on the short side and the lug part flanges 46, 46 are formed to be larger than thickness a, b, c of the outer peripheral walls 431, 432 and the partition walls 433 (for example to be 1 mm). The flanges 44 serve as an aligning stopper when the insulating member 4 is fitted into the slot 101 shown in FIG. 1 and also enable preventing varnish from leaking. Further, after molding of the insulating member 4, it is not necessary to cut off the flanges 44.

Thermoplastic synthetic resin injected from a nozzle of an injection molding machine (not shown) flows through gates 473, 473 into the lug part flanges 46, 46 respectively. The gates 473, 473 are pinpoint gates connected to the lug part flanges 16, 16 at small points respectively. Direction of thermoplastic synthetic resin flowing through the gates 473, 473 into the lug part flanges 46, 46 is a direction of thickness of the lug part flanges 46, 46. Thermoplastic synthetic resin having flowed through the gates 473, 473 into the lug part flanges 46, 46 collides with confronting walls (not shown) of the lug part flanges 46, 46 to convert direction of flow thereof by 90° and causes flow-in velocity thereof to decrease, filling the lug part flanges 46, 46, the flanges 45, 45 on the long side and the flange 48 on the short side. Then, as thermoplastic synthetic resin flows into the thin outer peripheral walls 431, 432 and partition walls 433 at an optimum flow-in velocity, thermoplastic synthetic resin flows smoothly into the thin outer peripheral walls 431, 432 and partition walls 433. With the insulating member 4 of the fourth embodiment, the short side is longer than the insulating member 1 of the first embodiment, so that the flange 48 on the short side serve as runner effectively.

Fifth Embodiment of Insulating Member for Slot Coil

FIG. 7, (b) is an isometric projection view showing a main portion of an insulating member for a slot coil of a fifth embodiment of the present disclosure. An insulating member 5 for a slot coil of the fifth embodiment of the present disclosure is distinctive in that number of through-holes is different from number of through-holes 23 of the insulating member 2 of the second embodiment, and in that a flange on the short side is added and position of flow-in through a gate is different. That is, with the insulating member 5 of the fifth embodiment, four through-holes 53 are formed to be in a row. Further, with the insulating member 5, outer peripheral walls 531, 532 and partition walls 533 of through-holes 53 are formed to have a same thickness (a, b, c), being formed to be thin as of 0.15 mm to 0.55, though not shown in section. In the insulating member 5, flanges 54 are formed on outer periphery at the upper end of the through-holes 53. The flanges 54 are made up of two flanges 55, 55 on the long side and a flange 58 on the short side. The flanges 55, 55 on the long side are formed on the two long sides along whole length thereof respectively and the flange 58 on the short side is formed on a short side along whole length thereof. Thickness d of the flanges 55, 55 on the long side and the flange 58 on the short side, and height f of the flanges 55, 55 on the long side and the flange 58 on the short side are larger than thickness a, b, c of the outer peripheral walls 531, 532 and the partition walls 533 (for example to be 1 mm). The flanges 54 serve as an aligning stopper when the insulating member 5 is fitted into the slot 101 shown in FIG. 1 and also enable preventing varnish from leaking. Further, after molding of the insulating member 5, it is not necessary to cut off the flanges 54.

Thermoplastic synthetic resin injected through a nozzle of an injection molding machine (not shown) flows through a pin side gate 573 into the flange 58 on the short side. The pin side gates 573 is a pin point gate provided at a central position in the lengthwise direction of the flange 58 on the short side and connected to the flange 58 on the short side at a small point. A direction in which thermoplastic synthetic resin flows through the pin side gates 573 into the flanges 58 on the short side is a direction of thickness of the flange 58 on the short side. Thermoplastic synthetic resin having flowed through the pin side gate 573 into the flange 58 on the short side collides with confronting walls (not shown) of the flange 58 on the short side to convert direction of flow thereof by 90°, causing flow-in velocity thereof to decrease and filling the flange 58 on the short side and the flanges 55, 55 on the long side. Then, as thermoplastic synthetic resin flows into the thin outer peripheral walls 531, 532 and partition walls 533 at an optimum flow-in velocity, thermoplastic synthetic resin flows smoothly, thus making it possible to form a smooth molded article. That is, as the flanges 58 on the short side and the flanges 55, 55 on the long side serve as runners, thermoplastic synthetic resin flows smoothly into the thin outer peripheral walls 531, 532 and the partition walls 533.

Sixth Embodiment of Insulating Member for Slot Coil

Figure 8:
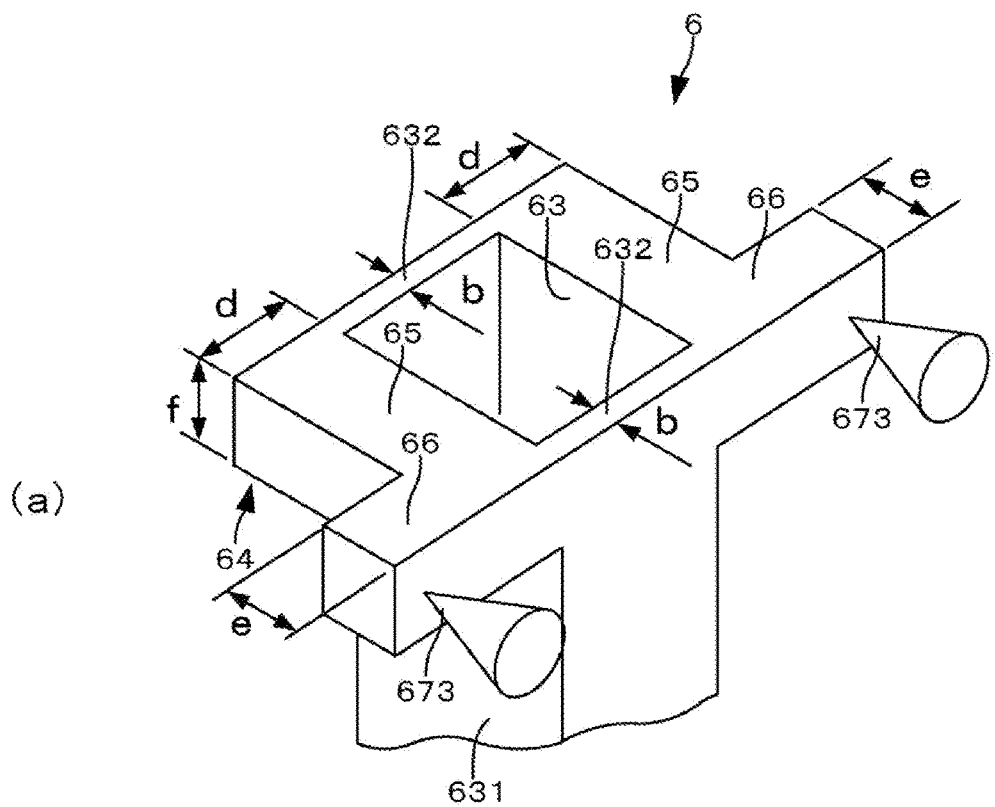
FIG. 8, (a) is an isometric projection view showing a main portion of an insulating member for a slot coil of a sixth embodiment of the present disclosure and in FIG. 8, (b) is an isometric projection view showing a main portion of an insulating member for a slot coil of a seventh embodiment of the present disclosure.
Figure 8:
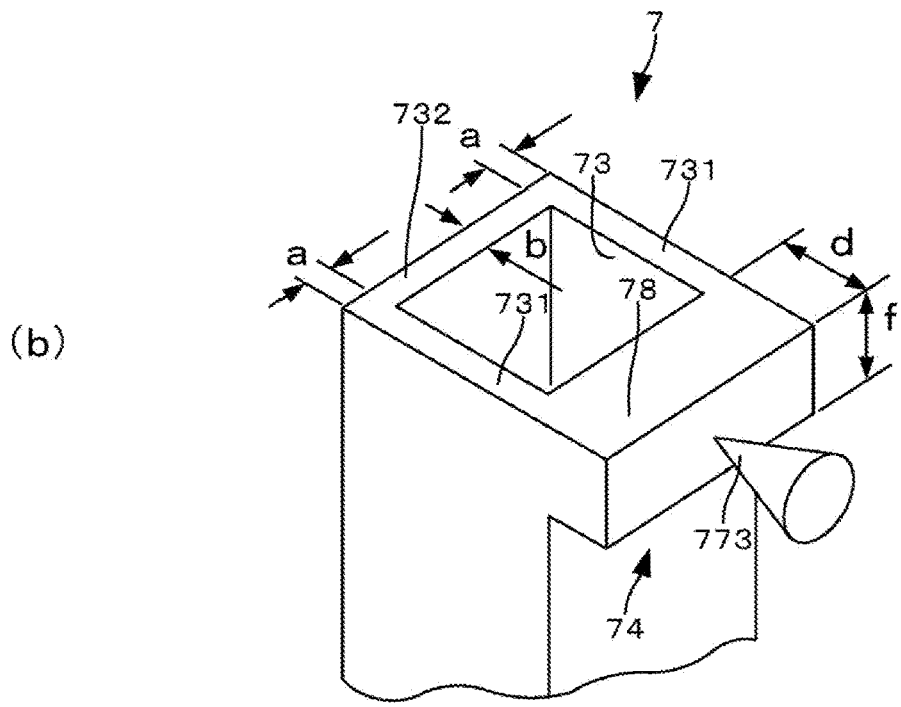

FIG. 8, (a) is an isometric projection view showing a main portion of an insulating member for a slot coil of a sixth embodiment of the present disclosure. An insulating member 6 for a slot coil of the sixth embodiment of the present disclosure is distinctive in that number and shape of through-holes are different from those of through-holes 13 of the insulating member 1 of the first embodiment. The insulating member 6 of the sixth embodiment has one through-hole 63 of a rectangular shape of a large area. With the insulating member 6, outer peripheral walls 631, 632 of the through-hole 63 has a same thickness (a (not shown), b) formed thin to be as of 0.15 to 0.55 mm. In the insulating member 6, flanges 64 are formed on outer periphery at the upper end of the through-hole 63. The flanges 64 are made up of two flanges 65, 65 on the long side and two lug part flanges 66, 66. The flanges 65, 65 on the long side are formed on the two long sides along whole length thereof respectively and the lug part flanges 66, 66 are formed at one end of the flanges 65, 65 on the long side to protrude with a right angle from the respective flanges 65, 65 on the long side. Thickness d of the flanges 65, 65 on the long side, thickness e of the lug part flanges 66, 66 and height f of the flanges 65, 65 on the long side and the lug part flanges 66, 66 are formed to be larger than thickness a, b of the outer peripheral walls 631, 632 (for example to be 1 mm). The flanges 64 serve as an aligning stopper when the insulating member 6 is fitted into the slot 101 shown in FIG. 1 and also enable preventing varnish from leaking. Further, after molding of the insulating member 6, it is not necessary to cut off the flanges 64.

Thermoplastic synthetic resin injected from a nozzle of an injection molding machine (not shown) flows through gates 673, 673 into the lug part flanges 66, 66 respectively. The gates 673, 673 are pin point gates connected to the lug part flanges 66, 66 at small points respectively. Direction of thermoplastic synthetic resin flowing through the gates 673, 673 into the lug part flanges 66, 66 is a direction of thickness of the lug part flanges 66, 66. Thermoplastic synthetic resin having flowed through the gates 673, 673 into the lug part flanges 66, 66 collides with confronting walls (not shown) of the lug part flanges 66, 66 to convert direction of flow thereof by 90° and causes flow-in velocity thereof to decrease, filling the lug part flanges 66, 66 and the flanges 65, 65 on the long side. Then, as thermoplastic synthetic resin flows into the thin outer peripheral walls 631, 632 at an optimum flow-in velocity, thermoplastic synthetic resin flows smoothly, thus making it possible to form a smooth molded article. That is, as the lug part flanges 66, 66 and the flanges 65, 65 on the long side serve as runners, thermoplastic synthetic resin flows smoothly into the thin outer peripheral walls 631, 632.

Seventh Embodiment of Insulating Member for Slot Coil

FIG. 8, (b) is an isometric projection view showing a main portion of an insulating member for a slot coil of a seventh embodiment of the present disclosure. An insulating member 7 for a slot coil of the seventh embodiment of the present disclosure has not the flanges 65, 65 on the long side and the lug part flanges 66, 66 of the insulating member 6 of the sixth embodiment of the present disclosure provided, but has a flange on the short side provided. That is, with the insulating member 7, outer peripheral walls 731, 732 around the through-hole 73 has a same thickness (a, b) formed thin to be as of 0.15 to 0.55 mm. In the insulating member 7, a flange 74 is formed on outer periphery at the upper end of the through-hole 73. The flange 74 is made up of one flange 78 on the short side. Thickness d of the flange 78 on the short side and height f of the flange 78 on the short side are formed to be larger than thickness a, b of the outer peripheral walls 731, 732 (for example to be 1 mm). This flange 74 serves as an aligning stopper when the insulating member 7 is fitted into the slot 101 shown in FIG. 1 and also enable preventing varnish from leaking. Further, after molding of the insulating member 7, it is not necessary to cut off the flange 74.

Thermoplastic synthetic resin injected from a nozzle of an injection molding machine (not shown) flows through a pin side gate 773 into the flange 78 on the short side. The pin side gate 773 is a pin point gate provided at a central position of the flange 78 on the short side in lengthwise direction thereof and connected thereto at a small point. Direction of thermoplastic synthetic resin flowing through the gates 773 into the flange 78 on the short side is a direction of thickness of the flanges 78 on the short side. Thermoplastic synthetic resin having flowed through the gates 773 into the flange 78 on the short side collides with a confronting wall (not shown) of the flange 78 on the short side to convert direction of flow thereof by 90° and causes flow-in velocity thereof to decrease, filling the flange 78 on the short side. Then, as thermoplastic synthetic resin flows into the thin outer peripheral walls 731, 732 at an optimum flow-in velocity, thermoplastic synthetic resin flows smoothly, thus making it possible to form a smooth molded article. That is, as the flange 78 on the short side serves as a runner, thermoplastic synthetic resin flows smoothly into the thin outer peripheral walls 731, 732.

Eighth Embodiment of Insulating Member for Slot Coil

Figure 9:
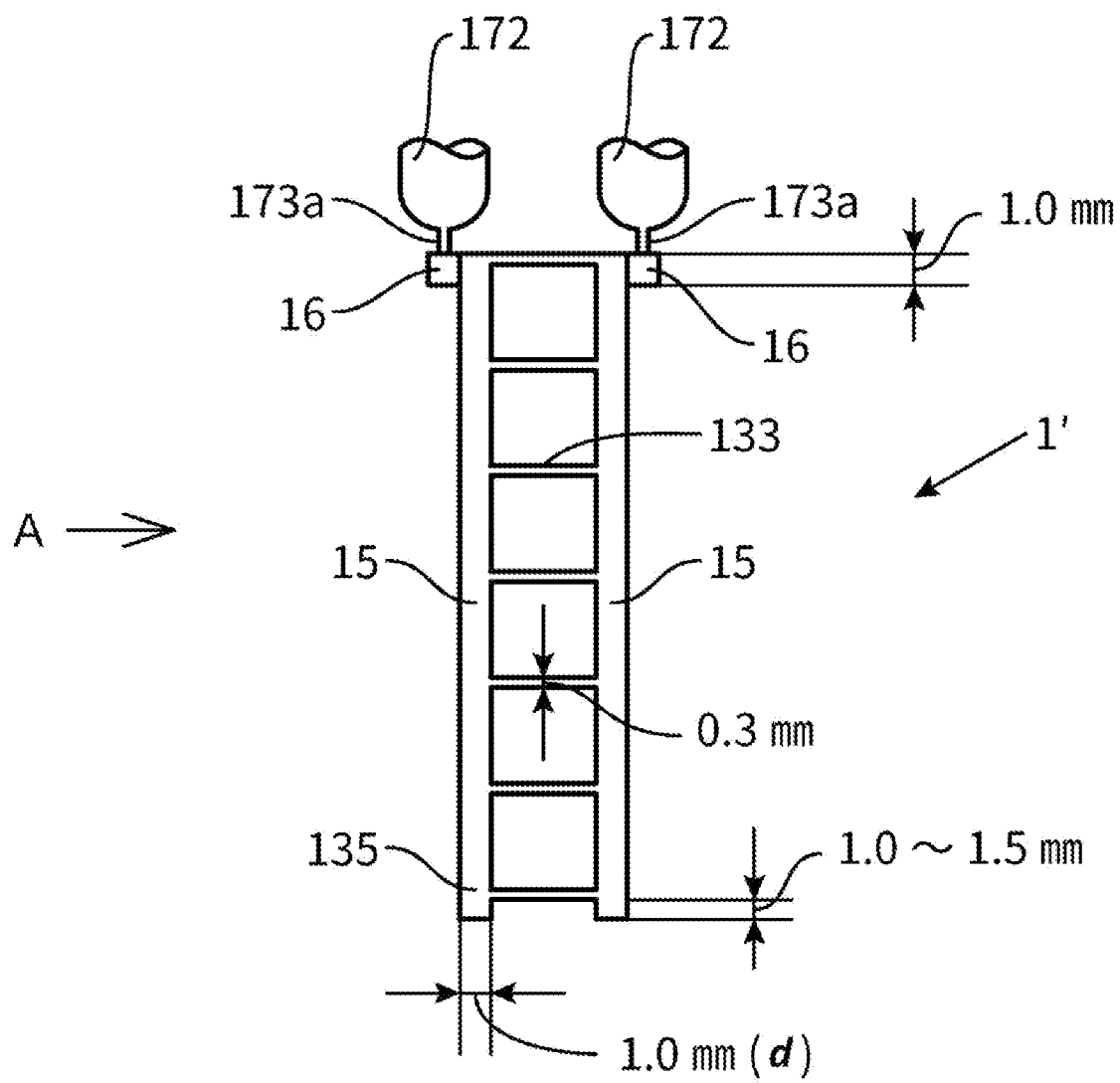
FIG. 9 is a plan view showing an insulating member for a slot coil of an eighth embodiment of the present disclosure.
Figure 10:
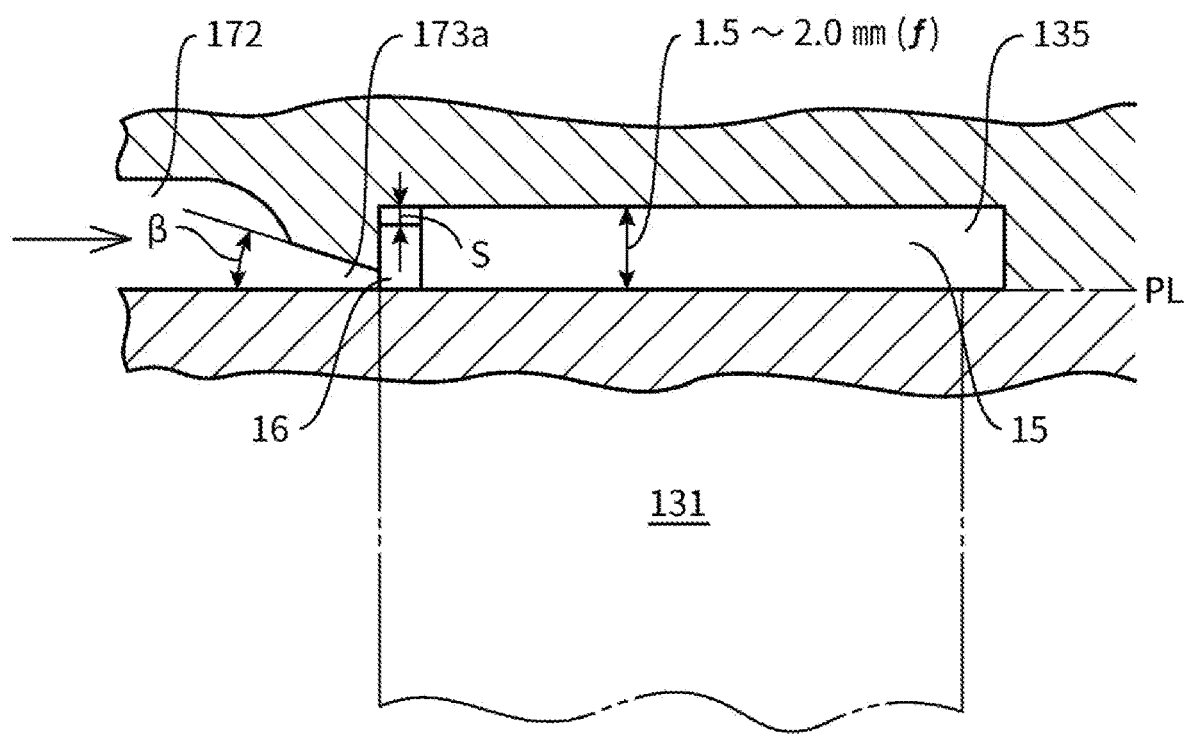
FIG. 10 a partial enlarged view of FIG. 9 as seen in a direction of an arrow A.

FIG. 9 is a plan view showing an insulating member 1' for a slot coil of an eighth embodiment of the present disclosure. FIG. 10 is a partial enlarged view of FIG. 9 as seen in a direction of an arrow A. The insulating member 1' for a slot coil of the eighth embodiment is analogous to the insulating member 1 for a slot coil of the first embodiment shown in FIGS. 2 to 4 in shape and a method for molding thereof. In a case where the insulating member 1 for a slot coil of the first embodiment has long and thin (for example no more than 0.3 mm) outer peripheral walls 131, 132 and partition walls 133, such a situation may occur that injected resin does not flow fully through cavity of the metallic mold. The insulating member 1' for a slot coil of the eighth embodiment has a structure with which flow of injected resin is improved. The insulating member 1' for a slot coil of the eighth embodiment will be explained only for portions different from those of the first embodiment, omitting explanation of portions of same shape and arrangement below. Each of both flanges 15 on the long side of the insulating member for a slot coil of the eighth embodiment has a cross sectional area with $d=1.0$ mm and $f=1.5$ to $2.0$ mm and area of cross section thereof is larger than that of the first embodiment. A molten resin basin 135 extended from the flange 15 on the long side is formed at an end of each of the flanges 15 on the long side. The molten resin basins 135 are extended from the flanges 15 on the long side by about 1.0 to 1.5 mm in this embodiment.

The gate in this embodiment 173a has a pyramid form with a rectangular cross section and preferably has an inclination angle β preferably of about 30° (see FIG. 10). With the gate 173a having a pyramid form, molten resin can flow smoothly. Injected molten resin is squeezed through the gate 173a to generate friction heat, raising temperature of molten resin to lower its viscosity, thus flowing to lug part flanges 16. Molten resin flowing to the lug part flanges 16 further flows into the flanges 15, 15 on the long side, converting direction of flow by 90° (see FIG. 3, (b)). Height of the lug part flanges 16 is lower than the flanges 15 on the long side by S mm. That is, molten resin discharged from the gates 173a flows to the lug part flanges 16 having a cross section of flow path narrower than the flanges 15 on the long side. Then, molten resin flows into the flanges 15 on the long side after converting direction of flow twice each by 90°. As molten resin flows into the flanges 15 on the long side through the 16 having a cross section of flow path narrower than the flanges 15 on the long side, the lug part flanges 16 serve for restraining flow of resin.

As molten resin converts direction of flow each by 90° twice, dynamic pressure of molten resin decrease, so that molten resin does not flow out at once through the gates 173a into the flanges 15 on the long side. As a consequence, molten resin does not flow at once into the flanges 15 on the long side, the partition walls 133, the outer peripheral walls 131, 132, etc. After molten resin has flowed into the flanges 15 on the long side as flow paths having a large area of cross section and small resistance to flow and filled the molten resin basin 135 at the end thereof, the molten resin flows into the outer peripheral walls 131, 132 and the partition walls 133. Further, as the molten resin basins 135 are formed at the end of the flanges 15 on the long side opposite to the gates 173a, flow of injected molten resin into the thin outer peripheral walls 131, 132 and partition walls 133 is induced after it has filled the flanges 15 on the long side and the molten resin basins 135. Specifically in a case where the outer peripheral walls 131, 132 and the partition walls 133 are long (downwards in FIG. 10), molten resin flows evenly and smoothly into the outer peripheral walls 131, 132 and the partition walls 133, as the molten resin basins 135 are formed at the end of the flanges 15 on the long side opposite to the lug part flanges 16, and the gates 173a.

Ninth Embodiment of Insulating Member for Slot Coil

Figure 11:
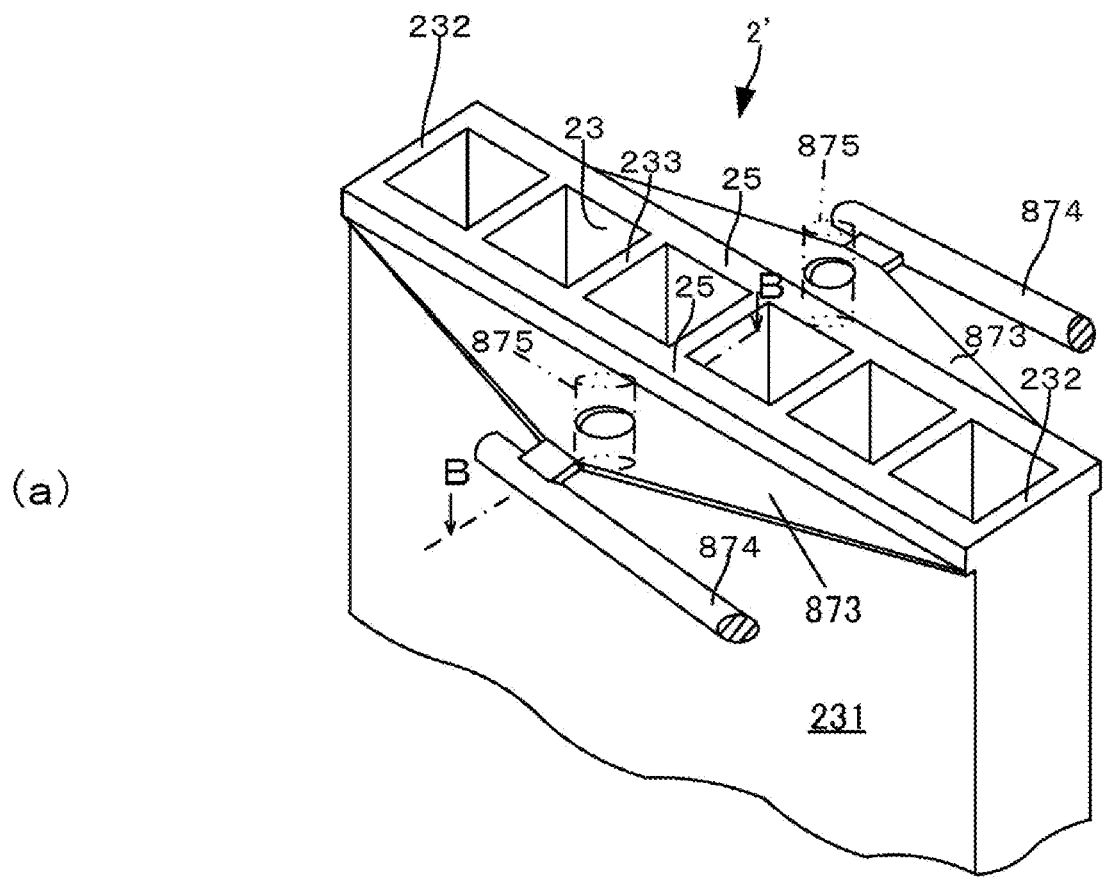
FIG. 11, (a) is an isometric projection view showing whole of an insulating member for a slot coil of a ninth embodiment of the present disclosure and in FIG. 11, (b) is a partial sectional view of (a) in FIG. 11 taken along a line B-B.
Figure 11:
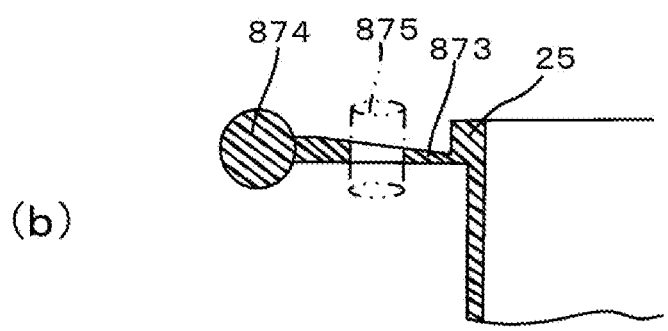

FIG. 11, (a) is an isometric projection view showing of an insulating member 2' for a slot coil of a ninth embodiment of the present disclosure, and in FIG. 11, (b) is a partial sectional view of (a) in FIG. 11 taken along a line B-B. The insulating member 2' for a slot coil of the ninth embodiment is analogous to the insulating member 2 for a slot coil of the second embodiment shown in FIG. 6, in shape and a method for molding thereof. In a case where the insulating member 2 for a slot coil of the second embodiment has long and thin outer peripheral walls 231, 232 and partition walls 233, such a situation may occur that injected resin does not flow fully through cavity of the metallic mold. The insulating member 2' for a slot coil of the ninth embodiment has a structure with which flow of injected resin is improved. The insulating member 2' for a slot coil of the ninth embodiment will be explained only for portions different from those of the second embodiment, omitting explanation of portions of same shape and arrangement below.

Molding of the insulating member 2' of the ninth embodiment of the present disclosure is an example using a fan gate(s) (fan shaped) 873 in molding thereof. The fan gate is a thin (shallow), film-shaped and thin (shallow) gate(s) with a large width having a length same as a width of the flange 25 on the long side of the insulating member 2'. This is also an example in which fan gates 873 are disposed on the both sides of the flanges 25 on the long side. The fan gates 873 has function with which molten resin flows so as to spread direction of flow towards the flanges 25 on the long side and fills the flanges 25 on the long side evenly, thus preventing drift, etc. It is known that the fan gates 873 are used for resin such as crystalline resin with which drift occurs easily. With the fan gates 873 in the ninth embodiment of the present disclosure, resin flows fast at the center position of the fan gates 873 especially if pressure of injection molding is high. For preventing this, cylindrical pins 875 (also referred to as control pins 875) are disposed in a metallic mold for injection molding (not shown) in this embodiment. With the cylindrical pins 875 disposed, it is possible to create turbulent flow in molten resin flowing through runners 874 to the fan gates 873 and to restrain the molten resin flowing into central portion of the flanges 25 on the long side, thus causing molten resin flowing into the flanges 25 to be even.

Tenth Embodiment of Insulating Member for Slot Coil

Figure 12:
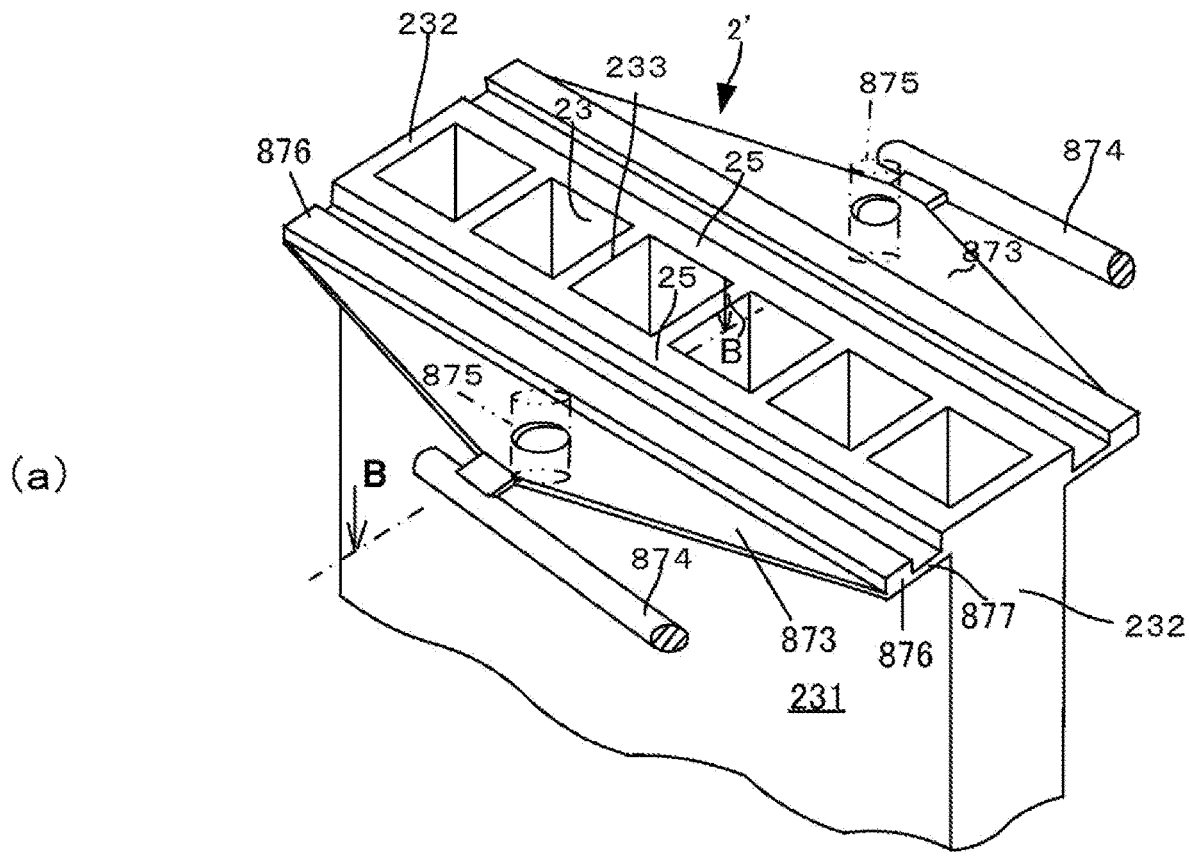
FIG. 12, (a) is an isometric projection view showing whole of an insulating member for a slot coil of a tenth embodiment of the present disclosure, and in FIG. 12, (b) is a partial sectional view of (a) in FIG. 12 taken along a line B-B.
Figure 12:
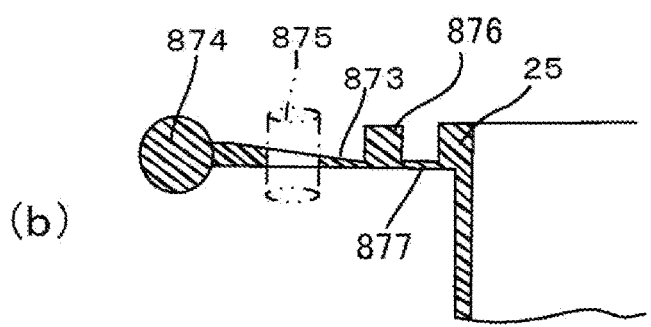

FIG. 12, (a) is an isometric projection view showing an insulating member 2" for a slot coil of a tenth embodiment of the present disclosure, and in FIG. 12, (b) is a partial sectional view of (a) in FIG. 12 taken along a line B-B. The insulating member 2" of the tenth embodiment is identical with the ninth embodiment in using fan gates 873 for injection molding thereof. Injection molding of the insulating member 2" of the tenth embodiment is different from that of the ninth embodiment in causing molten resin to flow from fan gates 873 through molten resin basins 876 and film-shaped film runners 877 into the flanges 25 respectively in the tenth embodiment. The molten resin basins 876 can be said to be a kind of mini runners. As flow of molten resin from the fan gates 873 becomes turbulent because it is squeezed, flow is stabilized by changing dynamic pressure to static pressure in the molten resin basins 876. Molten resin stabilized in the molten resin basins 876 becomes laminar flow in the film runner 877 having flow path with even cross section to flow into the flanges 25 on the long side. As understood from this explanation, molten resin flows smoothly into the outer peripheral walls 231, 232 for the insulating member 2" molded by the method of the tenth embodiment, so that an insulating member 2" having long outer peripheral walls also can be molded.

Other Embodiments of an Insulating Member for a Slot Coil

While the gates 173a of the eighth embodiment explained above are ones as so-called side gates, angle at which these gates are disposed may be changed with 90° from that shown in the figure, according to a structure of a metallic mold for injection molding. Even in this case, such structure is preferable that molten resin flows into the flanges 15 on the long side converting direction of flow each by 90° twice. Further, the insulating members 1 to 7 of the embodiments explained above have been explained as ones for a stator of a rotary electric machine. However, the insulating members 1 to 7 may be used also for rotors. While the control pins 875 in the ninth embodiment explained above have a circular cross section, they are not limited to have such a shape. As the control pins 875 are disposed so as to cause flow of resin evenly and are a kind of member for flow control inhibiting or delaying flow of injected molten resin, they may have other shapes of cross section as long as they provide this function.

What is claimed is:

1. A method for molding an insulating member for a slot coil of a rotary electric machine, wherein said slot coil being fitted into a slot provided in a stator or rotor of the rotary electric machine, and the method comprises:

forming the insulating member by molding of thermoplastic synthetic resin, wherein the insulating member is formed with through-holes with rectangular cross section for inserting lead wire and the through-holes are parallel to each other, and the insulating member has partition walls and outer peripheral walls for insulating the lead wire electrically, and inserting the lead wire into the through-holes, wherein the lead wire having a cross section similar to the cross section of the through-holes;

wherein said insulating member has at least one flange formed on periphery at one end thereof as well as formed to be thicker than the partition walls and the outer peripheral walls, the at least one flange serving as flow path for injected molten resin as the thermoplastic synthetic resin when the insulating member is formed by injection molding;

wherein in the method for molding the insulating member, lug part flanges are disposed to be integral with the at least one flange for causing molten resin to flow through gates for injecting the molten resin, after then to convert direction of flow by 90° twice and then to flow into the at least one flange when the insulating member is formed by injection molding of molten resin.

2. The method for molding the insulating member for a slot coil of a rotary electric machine according to claim 1, wherein the at least one flange has a molten resin basin disposed at one end of the at least one flange for storing the molten resin in time of injection molding.

3. The method for molding the insulating member for a slot coil of a rotary electric machine according to claim 2, wherein an injection molding machine used for injection molding is a high-speed injection molding machine with which injection speed attains a peak within 0.1 sec.

4. The method for molding the insulating member for a slot coil of a rotary electric machine according to claim 1, wherein the at least one flange consist of two flanges disposed parallel to each other and serve for aligning the insulating member when the at least one flange is fitted into the slot and the two flanges have a same area of cross section in a plane perpendicular to the lengthwise direction of the two flanges.

5. A method for molding an insulating member for a slot coil of a rotary electric machine, wherein said slot coil being fitted into a slot provided in a stator or rotor of the rotary electric machine, and the method comprises:

forming the insulating member by molding of thermoplastic synthetic resin, wherein the insulating member is formed with through-holes with rectangular cross section for inserting lead wire and the through-holes are parallel to each other, and the insulating member has partition walls and outer peripheral walls for insulating the lead wire electrically, and inserting the lead wire into the through-holes, wherein the lead wire having a cross section similar to the cross section of the through-holes;

wherein said insulating member has at least one flange formed on periphery at one end thereof as well as formed to be thicker than the partition walls and the outer peripheral walls, the at least one flange serving as flow path for injected molten resin as the thermoplastic synthetic resin when the insulating member is formed by injection molding;

wherein the insulating member is formed by injection molding through at least one fan gate provided on a long side of the at least one flange and having same width with the long side when the insulating member is formed by injection molding.

6. The method for molding the insulating member for a slot coil of a rotary electric machine according to claim 5, wherein a flow control member for inhibiting or delaying flow of injected molten resin is disposed in the at least one fan gate, and also provided with:

a molten resin basin disposed parallel to the at least one fan gate and downstream thereof, and at least one film-shape runner disposed downstream of the molten resin basin.

7. The method for molding the insulating member for a slot coil of a rotary electric machine according to claim 6, wherein an injection molding machine used for injection molding is a high-speed injection molding machine with which injection speed attains a peak within 0.1 sec.

8. The method for molding the insulating member for a slot coil of a rotary electric machine according to claim 5, wherein the at least one flange consist of two flanges disposed parallel to each other and serve for aligning the insulating member when the at least one flange is fitted into the slot and the two flanges have a same area of cross section in a plane perpendicular to the lengthwise direction of the two flanges.

* * * * *